(12) United States Patent
Gindy et al.

(10) Patent No.: US 12,050,142 B2
(45) Date of Patent: Jul. 30, 2024

(54) EFFECTIVE GAUGE FACTOR UTILIZING INTEGRATED MILLIVOLT AMPLIFIER FOR STRAIN GAUGE APPLICATIONS

(71) Applicants: Sherif S. Gindy, Macomb Township, MI (US); Sensordata Technologies, Inc., Shelby Township, MI (US)

(72) Inventors: Sherif S. Gindy, Macomb Township, MI (US); Daniel A. Tardiff, Troy, MI (US)

(73) Assignee: Sensordata Technologies, Inc., Shelby Township, MI (US)

( * ) Notice: Subject to any disclaimer, the term of this patent is extended or adjusted under 35 U.S.C. 154(b) by 299 days.

(21) Appl. No.: 17/713,745

(22) Filed: Apr. 5, 2022

(65) Prior Publication Data

US 2023/0314245 A1  Oct. 5, 2023

(51) Int. Cl.
 *G01L 1/22* (2006.01)
(52) U.S. Cl.
 CPC .......... *G01L 1/2262* (2013.01); *G01L 1/2206* (2013.01); *G01L 1/2287* (2013.01)
(58) Field of Classification Search
 None
 See application file for complete search history.

(56) References Cited

U.S. PATENT DOCUMENTS

| | | | | |
|---|---|---|---|---|
| 2005/0023047 A1* | 2/2005 | Yoshikuwa | .......... | G01G 23/012 177/229 |
| 2006/0132146 A1 | 6/2006 | Bentley | | |
| 2014/0290376 A1 | 10/2014 | Rahajandraibe et al. | | |
| 2015/0107367 A1 | 4/2015 | Kosberg et al. | | |
| 2017/0077876 A1 | 3/2017 | Quilligan et al. | | |
| 2017/0194911 A1 | 7/2017 | Aksin | | |
| 2017/0310290 A1 | 10/2017 | Splithof | | |
| 2018/0059839 A1 | 3/2018 | Kim et al. | | |
| 2018/0091103 A1 | 3/2018 | Stan et al. | | |
| 2018/0198417 A1 | 7/2018 | Vijaykumar et al. | | |
| 2018/0231429 A1 | 8/2018 | Krommenhock et al. | | |
| 2018/0231621 A1 | 8/2018 | Higashi et al. | | |
| 2019/0187010 A1 | 6/2019 | Knickerbocker et al. | | |
| 2019/0275681 A1* | 9/2019 | Böhme | .................. | B25J 13/085 |
| 2020/0007089 A1 | 1/2020 | Ahmed et al. | | |
| 2020/0129261 A1 | 4/2020 | Eschbach | | |
| 2021/0018307 A1 | 1/2021 | Toda et al. | | |
| 2021/0033476 A1 | 2/2021 | Toda et al. | | |

(Continued)

*Primary Examiner* — Brandi N Hopkins
*Assistant Examiner* — Nigel H Plumb
(74) *Attorney, Agent, or Firm* — Maiorana Patent Law, PA

(57) ABSTRACT

An apparatus comprises a sensor, a plurality of strain gauges, and a multiplier circuit. The sensor generally comprises a strain member configured to deform according to a force applied thereto. The plurality of strain gauges may be bonded to the sensor and connected to form a Wheatstone bridge. The Wheatstone bridge is generally configured to generate a first output signal in response to an excitation voltage. The first output signal is generally proportional to the force applied to the sensor. The multiplier circuit is generally mounted within the sensor and coupled to the Wheatstone bridge. The multiplier circuit may be configured to generate a second output signal in response to the excitation voltage and the first output signal. The second output signal generally comprises a scaled version of the first output signal.

20 Claims, 10 Drawing Sheets

(56) References Cited

U.S. PATENT DOCUMENTS

| | | |
|---|---|---|
| 2021/0063258 A1 | 3/2021 | Sato et al. |
| 2021/0096034 A1 | 4/2021 | Tanemura et al. |
| 2021/0181044 A1* | 6/2021 | McVeigh ................ H03M 1/80 |
| 2021/0278295 A1 | 9/2021 | Dorneich et al. |
| 2021/0293633 A1 | 9/2021 | Li et al. |

* cited by examiner

EFFECTIVE GAUGE FACTOR UTILIZING INTEGRATED MILLIVOLT AMPLIFIER FOR STRAIN GAUGE APPLICATIONS

FIELD OF THE INVENTION

The invention relates to transducers generally and, more particularly, to a method and/or apparatus for implementing an effective gauge factor utilizing an integrated millivolt amplifier for strain gauge applications.

BACKGROUND

Transducers are apparatuses that transform one form of energy to another form that can be quantified by standard apparatus and/or measuring techniques. Transducers are generally used in force and torque measurements. Strain gauge transducers (or more commonly called "sensors") transform mechanical energy/stress/strain/applied to the transducers into electrical energy. Strain is defined as a ratio of a change in length (e.g., ΔL) relative to an initial unstressed reference length (e.g., ΔL/L). A strain gauge transducer transforms strain into an electrical signal (e.g., a millivolt level electrical signal). The main component of a strain gauge transducer is a Wheatstone bridge. The building block of the Wheatstone bridge is a strain gauge. The technology used is generally referred to as "Strain Gauge Technology".

A strain gauge transducer is a specially designed metallic element with an assembly of strain gauges (usually four) deployed therein in a Wheatstone bridge configuration. Some suitable power source excites the bridge. An apparatus (e.g., a digital volt meter or DVM) measures an output of the Wheatstone bridge in millivolts. The Wheatstone bridge continues to be balanced (zero millivolt output) until the metallic element is stressed. When the metallic element is stressed, an output that is linearly proportional to the stress on the metallic element is read (e.g., usually in millivolt/volt) by the DVM.

Theoretically speaking, an ideal sensor should be very stiff to withstand shock and adverse loading conditions, yet sensitive enough to feel the smallest possible force. However, in typical sensor structures, a stiffness of the sensor needs to be reduced in order for obtaining a higher sensitivity. With current state of the art transducers, realizing force sensing with both high-sensitivity and high-stiffness is difficult. Transducer designers generally compromise between higher millivolt output and safe stress levels on the metallic element of the sensor.

It would be desirable to implement an effective gauge factor utilizing an integrated millivolt amplifier for strain gauge applications.

SUMMARY

The invention concerns an apparatus comprising a sensor, a plurality of strain gauges, and a multiplier circuit. The sensor generally comprises a strain member configured to deform according to a force applied thereto. The plurality of strain gauges may be bonded to the sensor and connected to form a Wheatstone bridge. The Wheatstone bridge is generally configured to generate a first output signal in response to an excitation voltage. The first output signal is generally proportional to the force applied to the sensor. The multiplier circuit is generally mounted within the sensor and coupled to the Wheatstone bridge. The multiplier circuit may be configured to generate a second output signal in response to the excitation voltage and the first output signal. The second output signal generally comprises a scaled version of the first output signal.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
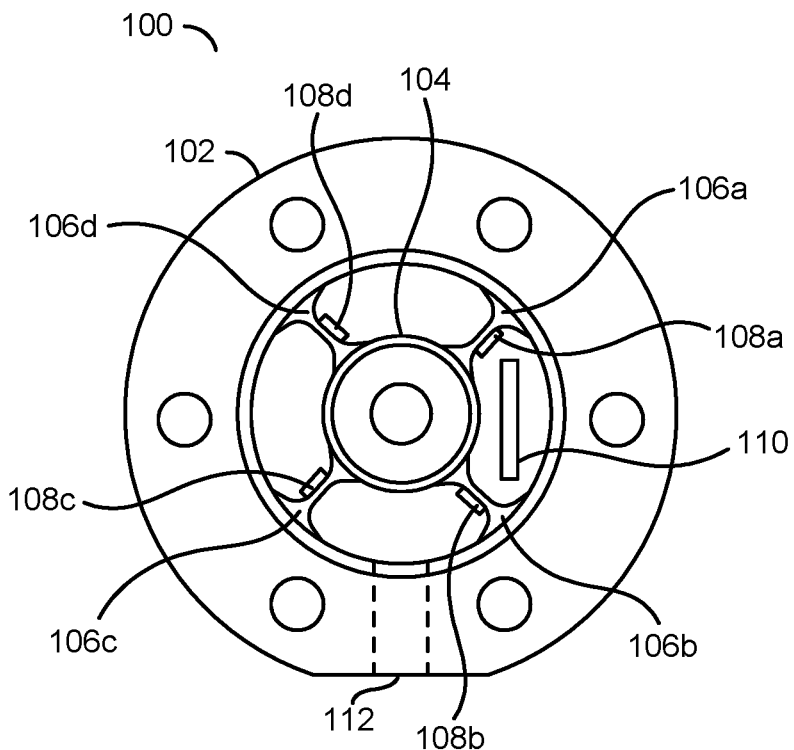
FIG. 1 is a diagram illustrating a plan view of a sensor in accordance with an example embodiment of the invention.

Embodiments of the invention include providing an effective gauge factor utilizing an integrated millivolt amplifier for strain gauge applications that may (i) be integrated with a Wheatstone bridge, (ii) provide a strain gauge with an effective gauge factor of 3 or 4 or 5 or 6 or 7 or 8 or 9 or 10 or fractions thereof, (iii) amplify a native millivolt level signal to a larger millivolt level signal, (iv) be transparent to any data acquisition system that may be used with a sensor, (v) be transparent to a shunt calibration function of a sensor, (vi) share the same excitation as the Wheatstone bridge, (vii) eliminate a need for special processing of output trimming in trimmed output sensors, (viii) eliminate a need for zero balancing of the Wheatstone bridge, (ix) allow linearization and temperature compensation components to be added easily when needed, especially in multi-component sensors, (x) be compact in size, (xi) be light weight, (xii) provide high overload capability, (xiii) provide a true "dual range" sensor, (xiv) provide mV/V output advantage over Volt or milliamp outputs, (xv) provide manufacturing advantages, (xvi) provide true fatigue design, (xvii) provide much longer sensor life, and/or (xviii) be implemented using one or more printed circuit boards.

In various embodiments, sensors (or apparatuses or transducers) may be implemented to measure one or more of bending, axial, shear, and/or torsional strains. In some embodiments, a sensor may be implemented as a load cell. A load cell is a force sensor (or force transducer) that measures force or weight. In some embodiments, a sensor may be implemented as a torque sensor (or torque transducer) to measure torque. In some embodiments, a multi-component sensor may be implement to measure multiple strains (e.g., tension, torque, bending, etc.) simultaneously.

In various embodiments, sensors may be implemented having a very high overload capability. Standard overload capacity of existing transducers is typically 150% of rated capacity. Some manufacturers of existing transducers claim overload protection or a higher overload capacity than 150%, but generally have a maximum of 200-300%. However, these manufacturers integrate additional mechanical sub-systems in the transducer designs. Such added overload auxiliaries generally prove to be non-repeatable and non-reliable. In contrast to existing transducers, a sensor implemented in accordance with an embodiment of the invention may provide overload protection up to about 1000% of rated capacity.

Often in testing programs, two extremes of a certain parameter are measured, both with the same accuracy. For example, to measure engine firing torque which is usually riddled with higher torque spikes, a high-capacity torque sensor with high overload capacity would be required. In contrast, to measure a bearing friction torque of a unit under test (UUT), a low-capacity sensor is required. Instead of breaking down an expensive test setup to change sensors, each suiting each mandate, a dual-range torque sensor with high overload capacity is needed. In an example, a sensor implemented in accordance with an embodiment of the invention generally provides an output that may mimic that of an existing sensor, but with much higher overload capability than existing transducers, yet simultaneously sensitive enough to capture lower torque values. Existing transducers claiming dual-range capability generally are made by mounting two different capacity sensors in series, with inherent handicaps.

In various embodiments, sensors may be implemented that provide a mV/V output advantage over existing transducers having Volt or milliamp outputs. In a typical test setup, a multitude of measured parameters exist. All measurements are generally fed into an elaborate data acquisition (DAQ) system with integrated software unique to the test objectives. Testing an internal combustion engine (ICE), for example, may include measurements of oil temperatures, coolant temperature, inlet air, exhaust gases, oil pressure, torque, vibration, etc.

In the current state of the art, native outputs of all these sensors, especially torque and force transducers, are usually mV/V outputs, rather than amplified to Volt levels. Amplification comes later as a function of the DAQ system and the associated software according to information processing and archiving. A sensor with a volt level output not only is adding a redundant capability but also may require a software modification of the existing DAQ system. Sensors with onboard amplifiers (volt level outputs) are usually used when one parameter only is tested. In various embodiments, sensor outputs are generally provided in the mV/V range, which is compliant with the industry standard for strain gauge transducers and can is compatible with any DAQ system.

In various embodiments, sensors may be provided having very high sensor stiffness. In an example, a ten times lower strain on a sensor means ten times lower deflection, and consequently ten times higher stiffness under a rated load. High sensor stiffness is an important trait for material testing machine manufacturers.

In some embodiments, sensors may be provided with a capacity on demand capability. A capacity on demand capability allows one sensor to fit different capacities. In current technology sensors, specific capacities are uniquely embedded in the design of critical dimensions of the sensors. In embodiments providing capacity on demand capability, a sensor size may be manufactured for a fraction (e.g., one-third, one-quarter, one-tenth, etc.) of a native capacity.

Referring to FIG. 1, a diagram is shown illustrating a plan view of a sensor in accordance with an example embodiment of the invention. In an example, a sensor (or apparatus or transducer) 100 may be implemented as a force sensor. In an example, the sensor 100 may be configured to measure tension or compression. In an example, the sensor 100 may comprise a first cylindrical member 102, a second cylindrical member 104, a plurality of strain members (or beams) 106a-106n, a plurality of strain gauges 108a-108n and a multiplier circuit 110. In an example, the first cylindrical member 102 may be implemented as an outer cylindrical member and the second cylindrical member 104 may be implemented as an inner cylindrical member. In an example, the first cylindrical member 102, the second cylindrical member 104, and the plurality of strain members (or beams) 106a-106n may be formed (e.g., milled, cast, forged, etc.) from a single block of material. In an example, the first cylindrical member 102, the second cylindrical member 104, and the plurality of strain members (or beams) 106a-106n may be formed (e.g., milled, cast, forged, etc.) from steel (e.g., SAE 4340 alloy steel). However, other relative arrangements of the first cylindrical member 102 and the second cylindrical member 104 may be implemented to meet design criteria of a particular implementation. In an example, the first cylindrical member 102 and the second cylindrical member 104 may be arranged coaxially with one another, but separated from each other by some distance along a common axis. In an example, four beams 106a-106d may be configured to couple the first cylindrical member 102 and the second cylindrical member 104. In an example, the beams 106a-106d may be connected between an inner surface of the first cylindrical member 102 and an outer surface of the second cylindrical member 104 in a radial (or spoke-like) manner. However, other arrangements of the beams 106a-106d may be implemented to meet design criteria of a particular implementation.

In an example, the first cylindrical member 102 may be attached in a fixed position and the second cylindrical member 104 may be movable in response to a force applied to the second cylindrical member 104. The beams 106a-106d may be configured to deform according to the force applied to the second cylindrical member 104. In an example, deformation of the beams 106a-106d in response to the force applied to the second cylindrical member 104 is generally elastic (e.g., non-permanent). In an example, the beams 106a-106d are generally configured to be fatigue resistant.

In an example, four strain gauges 108a-108d may be attached to the four beams 106a-106d, respectively. In an example, the strain gauges 108a-108d may be implemented in a foil structure that may be adhesively attached to surfaces of the beams 106a-106d, so as to be deformable together with the respective beam 106a-106d. In another example, the strain gauges 108a-108d may be attached and fixed to the surfaces of the beams 106a-106d by bonding. In an example, the strain gauges 108a-108d may be implemented using conventional technology. In an example, the strain gauges 108a-108d may be implemented using a nickel chromium (NiCr) alloy, which provides a gauge (or gage) factor (GF) of two (e.g., GF-2). The gauge factor (GF) is generally defined as a ratio of (i) a change in resistance relative to an initial unstressed reference resistance (e.g., $\Delta R/R$) relative to (ii) a change in length relative to an initial unstressed reference length (e.g., $\Delta L/L$);

$$GF=\Delta R/R/\Delta L/L. \qquad \text{EQ. 1}$$

In an example, the strain gauges 108a-108n may allow high-precision measurement of the deformation of the beams 106a-106d in connection with bridge circuitry (e.g., described below in connection with FIG. 4), since the strain gauges 108a-108d change a respective resistance value with low expansion or compression.

In an example, the multiplier circuit 110 may be implemented as a small printed circuit board (PCB) that may be mounted within the sensor 100. In an example, the multiplier circuit 110 may be mounted within a space defined by the inner surface of the outer cylindrical member 102, the outer surface of the inner cylindrical member 104, and two of the beams 106a-106d (e.g., 106a and 106b). The strain gauges 108a-108n are generally electrically connected together (e.g., as a Wheatstone bridge) and to the multiplier circuit 110. In an example, small gauge conductive wires (not shown) may be used to connect the strain gauges 108a-108n and the multiplier circuit 110. In an example, the outer cylindrical member 102 may comprise a passage 112 that communicates from the exterior of the sensor 100 to the interior of the sensor 100.

Figure 2:
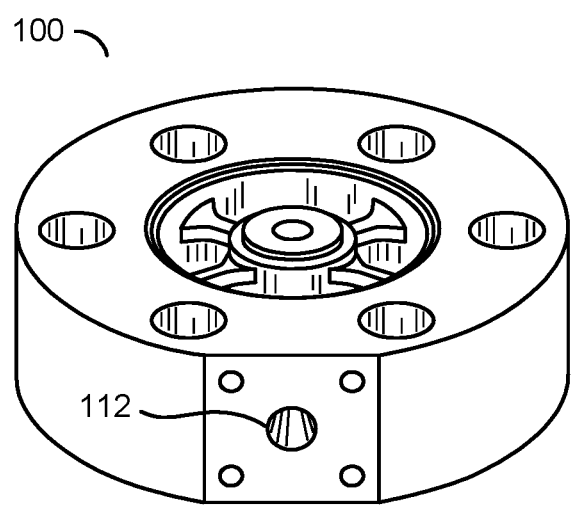
FIG. 2 is a diagram illustrating a perspective view of the sensor of FIG. 1.

Referring to FIG. 2, a diagram is shown illustrating a perspective view of the sensor 100 of FIG. 1. In an example, the outer cylindrical member 102 may be configured to allow a connector to be mounted on an exterior surface of the outer cylindrical member 102. The connector may be used to (i) apply an excitation supply voltage to the strain gauges 108a-108d and the multiplier circuit 110, and (ii) communicate electrical signals from the strain gauges 108a-108d and the multiplier circuit 110 to external measurement circuitry. In an example, wires may be passed from the exterior of the sensor 100 to the interior of the sensor 100 through the passage 112. In an example, the wires may be configured to electrically connect the strain gauges 108a-108d and the multiplier circuit 110 to the connector mounted on the exterior surface of the outer cylindrical member 102.

Figure 3:
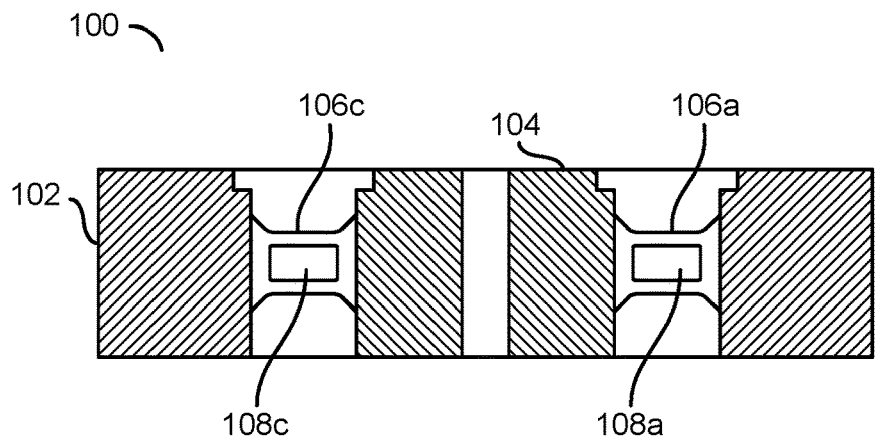
FIG. 3 is a diagram illustrating a cross-sectional view of the sensor of FIG. 1.

Referring to FIG. 3, a diagram is shown illustrating a cross-sectional view of the sensor 100 of FIG. 1. In an example, four strain gauges 108a-108d may be attached to the four beams 106a-106d, respectively. In an example, the strain gauge 108a-108d may be implemented in a foil structure that may be adhesively bonded to surfaces of the beams 106a-106d, so as to be deformable together with the respective beam 106a-106d. In another example, the strain gauges 108a-108d may be attached and fixed to the surfaces of the beams 106a-106d by bonding. In an example, the strain gauge 108a may be attached to a surface of the beam 106a and the strain gauge 108c may be attached to a surface of the beam 106c. The strain gauges 108b and 108d may be attached similarly to surfaces of the beams 106b and 106d, respectively. In an example, the strain gauges 108a-108n may allow high-precision measurement of the deformation of the beams 106a-106d in connection with bridge circuitry (to be described below), since the strain gauges 108a-108d change a respective resistance value with low expansion or compression.

As described above, the gauge factor (GF) for the stain gauges 108a-108d is defined as the ratio of (i) the change in resistance relative to the initial unstressed reference resistance (e.g., $\Delta R/R$) relative to (ii) the change in length relative to the initial unstressed reference length (e.g., $\Delta L/L$);

$$GF=\Delta R/R/\Delta L/L. \qquad \text{EQ. 1}$$

Strain is defined as the ratio of the change in length (e.g., $\Delta L$) relative to the initial unstressed reference length (e.g., $\Delta L/L$):

$$\varepsilon = \Delta L/L. \qquad \text{EQ. 2}$$

Thus, the gauge factor (GF) for the stain gauges 108a-108d is the ratio of (i) the change in resistance relative to the initial unstressed reference resistance (e.g., $\Delta R/R$) relative to (ii) the strain:

$$GF=\Delta R/R/\varepsilon. \qquad \text{EQ. 3}$$

Rearranging the equation above, it may be seen that for a given $\Delta R/R$, the higher the gauge factor GF, the lower strain $\varepsilon$:

$$\Delta R/R = GF \times \varepsilon. \qquad \text{EQ. 4}$$

For a given Wheatstone bridge output, the higher the GF of the strain gauges, the lower the strain $\varepsilon$ on the metal structure and the higher the stiffness, frequency response, fatigue life, etc.

In an example, the strain gauges 108a-108n and the multiplier circuit 110 may be configured to provide an effective gauge factor (EGF) that is greater than a native gauge factor (GF) of the strain gauges 108a-108n. By providing an effective gauge factor (EGF) that is greater than the native gauge factor of the strain gauges 108a-108n, the beams 106a-106d may be configured to provide higher stiffness, frequency response, fatigue life, etc. In various embodiments, a sensor implementing one or more effective gauge factors (EGFs) in accordance with an embodiment of the invention generally provides an advantage of realizing force sensing with both high-sensitivity and high-stiffness.

Figure 4:
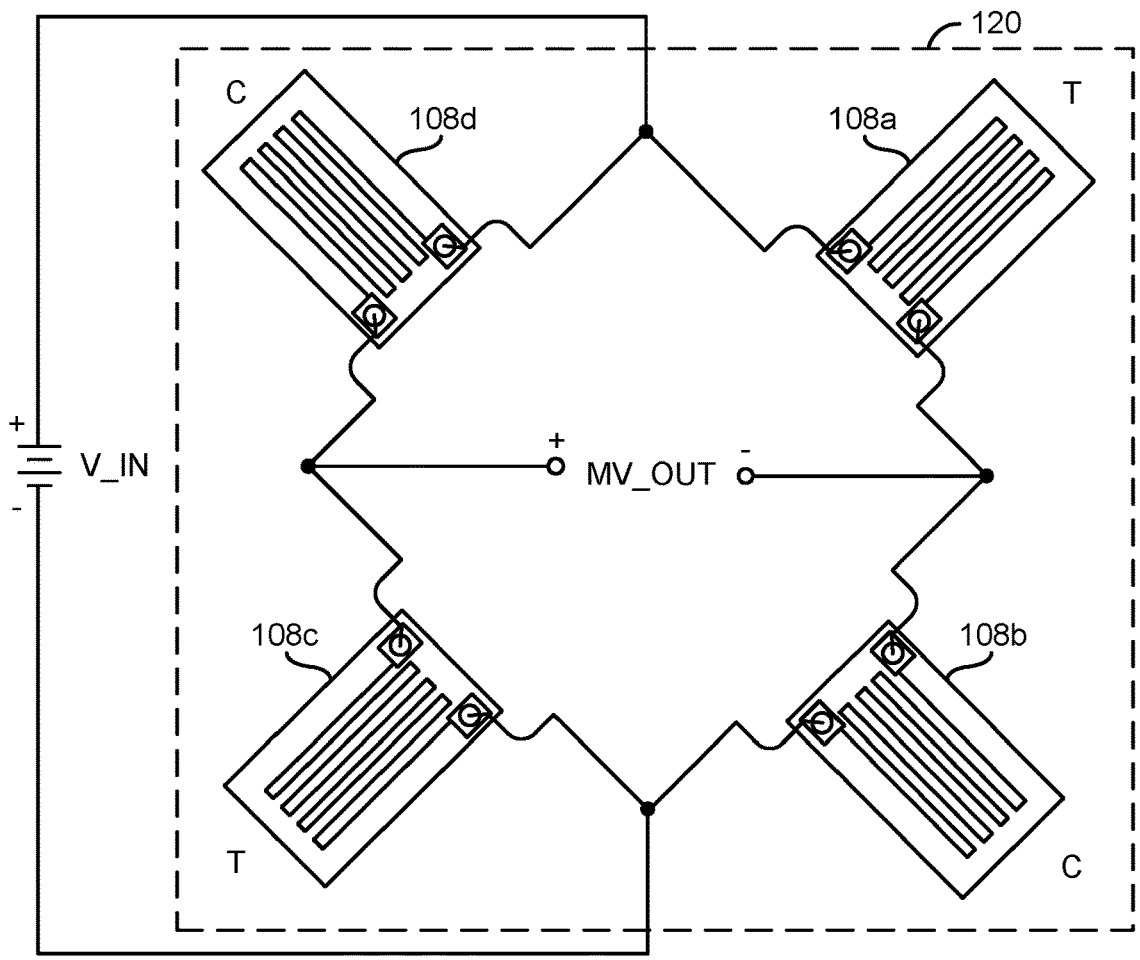
FIG. 4 is a diagram illustrating strain gauges arranged in a Wheatstone bridge configuration.

Referring to FIG. 4, a diagram is shown illustrating strain gauges arranged in a Wheatstone bridge configuration. In various embodiments, the strain gauges 108a-108d may be connected in a Wheatstone bridge configuration 120. In an example, a first terminal of the strain gauge 108a may be connected to a first terminal of the strain gauge 108b. A second terminal of the strain gauge 108b may be connected to a first terminal of the strain gauge 108c. A second terminal of the strain gauge 108c may be connected to a first terminal of the strain gauge 108d. A second terminal of the strain gauge 108d may be connected to a second terminal of the strain gauge 108a.

In an example, an excitation supply voltage (e.g., V_IN) may be connected between (i) a first node, formed by the connection of the second terminal of the strain gauge 108d and the second terminal of the strain gauge 108a, and (ii) a second node, formed by the connection of the second terminal of the strain gauge 108b and the first terminal of the strain gauge 108c. In an example, a positive side of the excitation supply voltage may be presented to the first node and a negative side of the excitation supply voltage may be presented to the second node. In an example, an output signal (e.g., MV_OUT) of the Wheatstone bridge 120 may be presented between (i) a third node, formed by the connection of the second terminal of the strain gauge 108c and the first terminal of the strain gauge 108d, and (ii) a fourth node, formed by the connection of the second terminal of the strain gauge 108a and the first terminal of the strain gauge 108b. In an example, a positive side of the output signal MV_OUT may be presented to the third node and a negative side of the output signal MV_OUT may be presented to the fourth node.

Strain is defined as the ratio of the change in length to the initial unstressed reference length. A strain gauge is the element that senses the change and converts the change into an electrical signal. The conversion of strain into an electrical signal may be accomplished because a strain gauge changes resistance as the strain gauge is stretched, or compressed, similar to wire. For example, when wire is stretched, a cross-sectional area of the wire decreases; therefore, the resistance of the wire increases.

Factors that generally need to be considered before selecting a strain gauge are the direction, type, and resolution of the strain to be measured. To measure minute strains, minute resistance changes need to be measured. The Wheatstone bridge configuration 120 is generally capable of measuring small resistance changes. In an example, a letter (e.g., T or C) is associated with each of the strain gauges 108a-108d to indicate a tensile (positive) strain T is applied to gauges 108a and 108c, and a compressive (negative) strain C. In general, the total strain is the sum of the four strains is applied to gauges 108b and 108d.

In an example, the total strain is generally represented by a change in the signal MV_OUT. If each of the strain gauges 108a-108d has the same positive strain, the total strain will be zero and the signal MV_OUT will remain unchanged. Bending, axial, and/or shear strain are the most common types of strain measured. The actual arrangement of the strain gauges 108a-108d generally determines the type of strain being measured and the change in a voltage level of the output signal MV_OUT. In an example, if a positive (tensile) strain is applied to gauges 108a and 108c, and a negative (compressive) strain is applied to gauges 108b and 108d, the total strain will generally be four times the strain on one of the strain gauges 108a-108d. Since the total strain is four times the strain on each of the strain gauges 108a-108d, the output of the Wheatstone bridge configuration 120 is generally four times larger than the output of a single one of the strain gauges 108a-108d. In general, the number of strain gauges alone does not increase measurement sensitivity. Rather, greater sensitivity and resolution may be possible when a Wheatstone bridge 4-arm configuration is used instead of a single strain gauge. In an example, some designs (e.g., multi-component sensors) may have a multiple of four strain gauges (e.g., 8, 16, etc.) but all in the Wheatstone bridge 4-arm configuration, all would have similar sensitivity (e.g., mV/V output). However, implementing the multiple of four strain gauges may provide an advantage in other characteristics, such as cross-talk between components, linearity, and repeatability of the sensor.

Figure 5C:
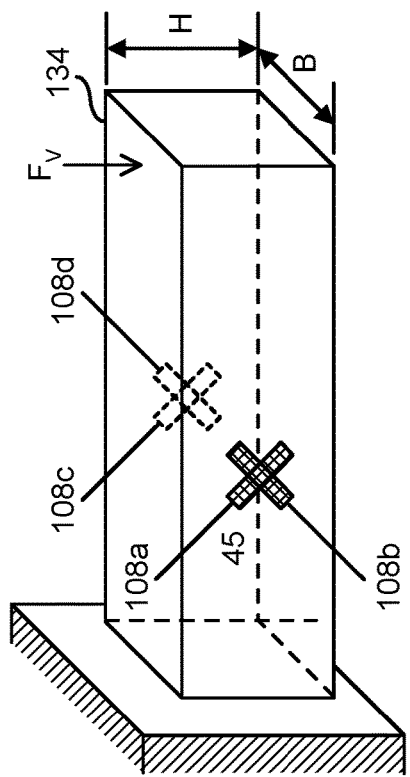
FIGS. 5A-5D are diagrams illustrating applications of a sensor circuit in accordance with an example embodiment of the invention.
Figure 5D:
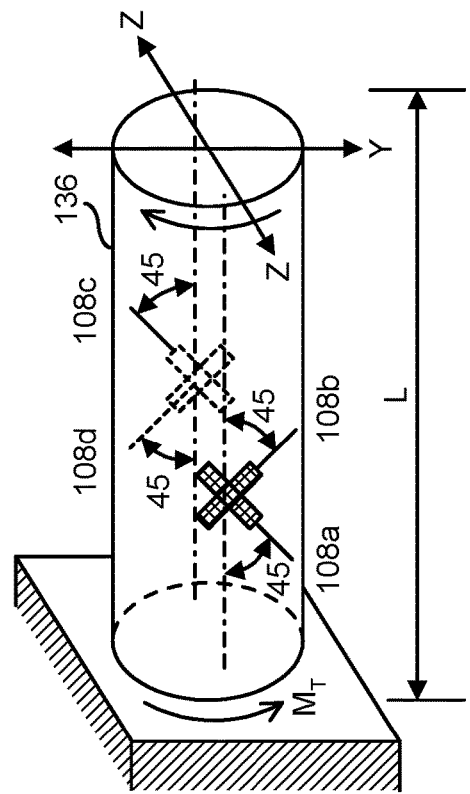
Figure 5A:
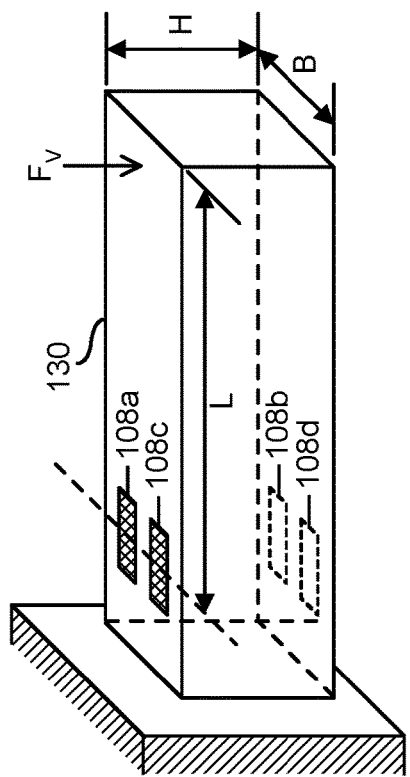

Referring to FIGS. 5A-5D, diagrams are shown illustrating strain gauge placements for measuring bending, axial, shear, and torsional strains using a sensor in accordance with an example embodiment of the invention. In FIG. 5A, the strain gauges 108a-108d are shown mounted on a beam (or specimen) 130 to measure bending strain. Bending (or moment) strain ($\epsilon_B$) is generally defined as bending (or moment) stress ($\sigma_B$) divided by Young's Modulus of Elasticity (E):

$$\epsilon_B = \sigma_B/E. \quad \text{EQ. 5}$$

Moment stress ($\sigma_B$) generally equals bending moment ($M_B$) divided by sectional modulus (Z), where $M_B$ is equal to vertical load (Fv) times moment length L:

$$\sigma_B = M_B/Z = Fv(L)/Z. \quad \text{EQ. 6}$$

Sectional modulus Z is a property of the cross-sectional configuration of the beam (or specimen) 130. For beams with a rectangular cross-section, the sectional modulus Z is generally represented by the following equation:

$$Z = (BH^2/6). \quad \text{EQ. 7}$$

Other cross-sections generally have different sectional moduli. Strain gauges used in the bending strain configuration may be used to determine the vertical load Fv.

$$Fv = E\epsilon_B(Z)/L = E\epsilon_B(BH^2/6)/L. \quad \text{EQ. 8}$$

In an example, the configuration illustrated in FIG. 5A may be referred to as a bending beam load cell.

Figure 5B:
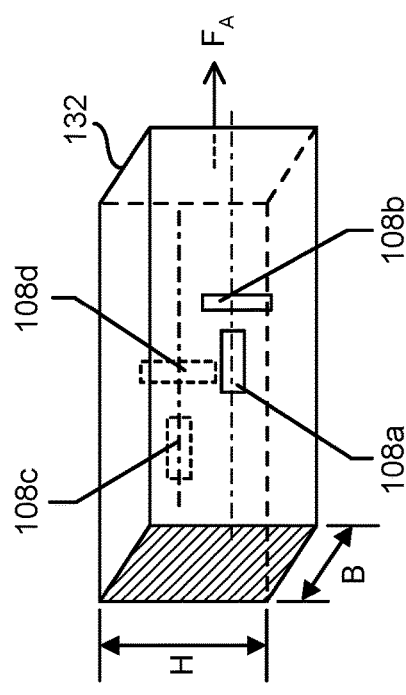

Referring to FIG. 5B, the strain gauges 108a-108d are shown mounted on a beam (or specimen) 132 to measure axial strain. Axial strain is generally defined as axial stress ($\sigma_A$) divided by Young's Modulus of Elasticity (E):

$$\epsilon_A = \sigma_A/E \quad \text{EQ. 9}$$

Axial stress ($\sigma_A$) generally equals the axial load $F_A$ divided by the cross-sectional area:

$$\sigma_A = F_A/A. \quad \text{EQ. 10}$$

The cross-sectional area for rectangles equals (B×H). Strain gauges used in axial configurations may be used to determine axial loads ($F_A$), as summarized in the following equation:

$$F_A = E\epsilon_A BH. \quad \text{EQ. 11}$$

Referring to FIG. 5C, the strain gauges 108a-108d are shown mounted on a beam (or specimen) 134 to measure shear strain. Shear strain ($\gamma$) is generally defined as shear stress ($\tau$) divided by the modulus of shear stress (G):

$$\gamma = \tau/G. \quad \text{EQ. 12}$$

Shear stress ($\tau$) generally equals the moment of area about the neutral axis (Q) multiplied by the vertical load (Fv) and divided by the thickness (B) and the moment of inertia (I).

$$\tau = Fv \times Q/BI. \quad \text{EQ. 13}$$

Both the moment of area (Q) and the moment of inertia (I) are functions of the cross-sectional geometry of the specimen 134. For rectangles only:

$$Q = BH^2/8 \quad \text{EQ. 14 and}$$

and $$I = BH^3/12. \quad \text{EQ. 15}$$

The shear strain ($\gamma$) may be determined by measuring the strain at a 45° angle, as shown in FIG. 5C:

$$\gamma = 2 \times \epsilon \ @45°. \quad \text{EQ. 16}$$

The modulus of shear strain (G)=E/2(1+μ). In an example, strain gauges used in a shear strain configuration may be used to determine vertical loads (Fv), which is more commonly referred to as a shear beam load cell, as summarized in the following equations:

$$Fv = G(\gamma)BI/Q \quad \text{EQ. 17}$$

$$= G(\gamma)B(BH^3/12)/(BH^2/8) \quad \text{EQ. 18}$$

$$= G(\gamma)BH(2/3). \quad \text{EQ. 19}$$

Referring to FIG. 5D, the strain gauges 108a-108d are shown mounted on a beam (or specimen) 136 to measure torsional strain. Torsional strain is generally defined as torsional stress (τ) divided by the torsional modulus of elasticity (G):

$$\gamma = 2 \times \varepsilon \ @ 45° = \tau/G. \qquad \text{EQ. 20}$$

Torsional stress (τ) generally equals torque ($M_t$) multiplied by the distance from the center of the section to the outer fiber (diameter (d)/2 for a solid circular shaft), divided by the polar moment of inertia (J):

$$\tau = M_t(d/2)/J. \qquad \text{EQ. 21}$$

The polar moment of inertia J is generally a function of the cross-sectional area. For solid circular shafts only, $J=\pi(d)^4/32$. The modulus of shear strain (G) is defined above. In an example, the strain gauges 108a-108d may be configured to determine torsional moments as illustrated by the following equations:

$$M_t = \tau(J)(2/d) \qquad \text{EQ. 22}$$

$$= \gamma G(J)(2/d) \qquad \text{EQ. 23}$$

$$= \gamma(\pi d^3/16) \qquad \text{EQ. 24}$$

$$\phi = M_T L/G(J). \qquad \text{EQ. 25}$$

In general, the capacity of a particular sensor is determined by the structure of the sensor and the strain gauges utilized. In various embodiments, a sensor may be constructed to provide one or more effective gauge factors (EGFs) by configuring a structure of the strain members (or beams) of the sensor and an integrated multiplier circuit coupled to a plurality of strain gauges attached to the strain members. In an example, a sensor may be implemented with the following characteristics: material is steel alloy (Young's modulus E=30×10E6 psi); strain gauges, are foil with GF=2.0; strain gauges are configured in a Wheatstone bridge (as described above in connection with FIG. 4). In an example using an axial force ($F_A$) of ±60,000 Lbs., a cross-sectional area (A) of 1.00 in. sq., and Young's modulus of elasticity E=30×10E6 psi, the following equations may be used:

$$\sigma_A = F/A = 60,000 \text{ psi} \qquad \text{EQ. 26}$$

$$E = \sigma_A/\varepsilon \qquad \text{EQ. 27}$$

$$\varepsilon = \sigma_A/E = 0.002 \text{ in/in}(2000 \text{ µin/in}). \qquad \text{EQ. 28}$$

By definition, $$GF = [\Delta R/R]/(\Delta L/L) \qquad \text{EQ. 1}$$

$$= [\Delta R/R]/\varepsilon = [\Delta R/R] \times E/\sigma_A \qquad \text{EQ. 29}$$

$$= [\Delta R/R] \times [E] \times [A]/F. \qquad \text{EQ. 30}$$

This configuration is known to a person familiar with the art to produce 2.0 mV/V of excitation voltage. Rewritten for F, $$F = \{[E \times A] \times [\Delta R/R]/GF\}. \qquad \text{EQ. 31}$$

The terms between square brackets are constants. Maintaining the same physical dimensions of the sensor and the same output, the sensor may be rated to measure the following:
- 60,000 Lb using GF-2 gauges;
- 30,000 Lb using GF-4 gauges;
- 12,000 Lb using an effective gauge factor (EGF) of 5;
- 10,000 Lb using an EGF of 6;
- 6,000 Lb using an EGF of 10; etc.

The change in length ΔL for this last capacity may be calculated using the following equation:

$$\Delta L = (0.1F) \times L/(E \times A) = 0.1(F \times L)/(E \times A). \qquad \text{EQ. 32}$$

Hence, a given structure may be used for different capacities, with increased overload capabilities, and possibility of making the given structure even serve as two capacity sensors in one. An additional advantage is the increase of the sensor stiffness. For a ±6,000 Lb force sensor, to have the same 2.0 mV/V output and using GF-2 gauges, the sensor should have an area of $$A' = 6,000/60,000 = 0.10 \text{ in sq} = 0.10 \text{ A},$$

and a deflection under full load of $$\Delta L' = (F' \times L)/(E \times A')$$
$$= (0.1F \times L)/(E \times 0.1A)$$
$$= (F \times L)/(E \times A)$$
$$= 10 \times \Delta L, = 0.1 \text{ stiffness of invention}$$

Stiffness K=F/ΔL. Hence, the stiffness of an existing sensor using GF-2 gauges may be expressed by the following equation:

$$K_{GF2} = 6000/[(F \times L)/(E \times A)]. \qquad \text{EQ. 33}$$

While the stiffness of a sensor in accordance with an embodiment of the invention using GF-2 gauges may be expressed by the following equation:

$$K \text{ invention} = 6000/0.1[(F \times L)/(E \times A)] \qquad \text{EQ. 34}$$
$$= 10 \ K_{GF2}.$$

Figure 6:
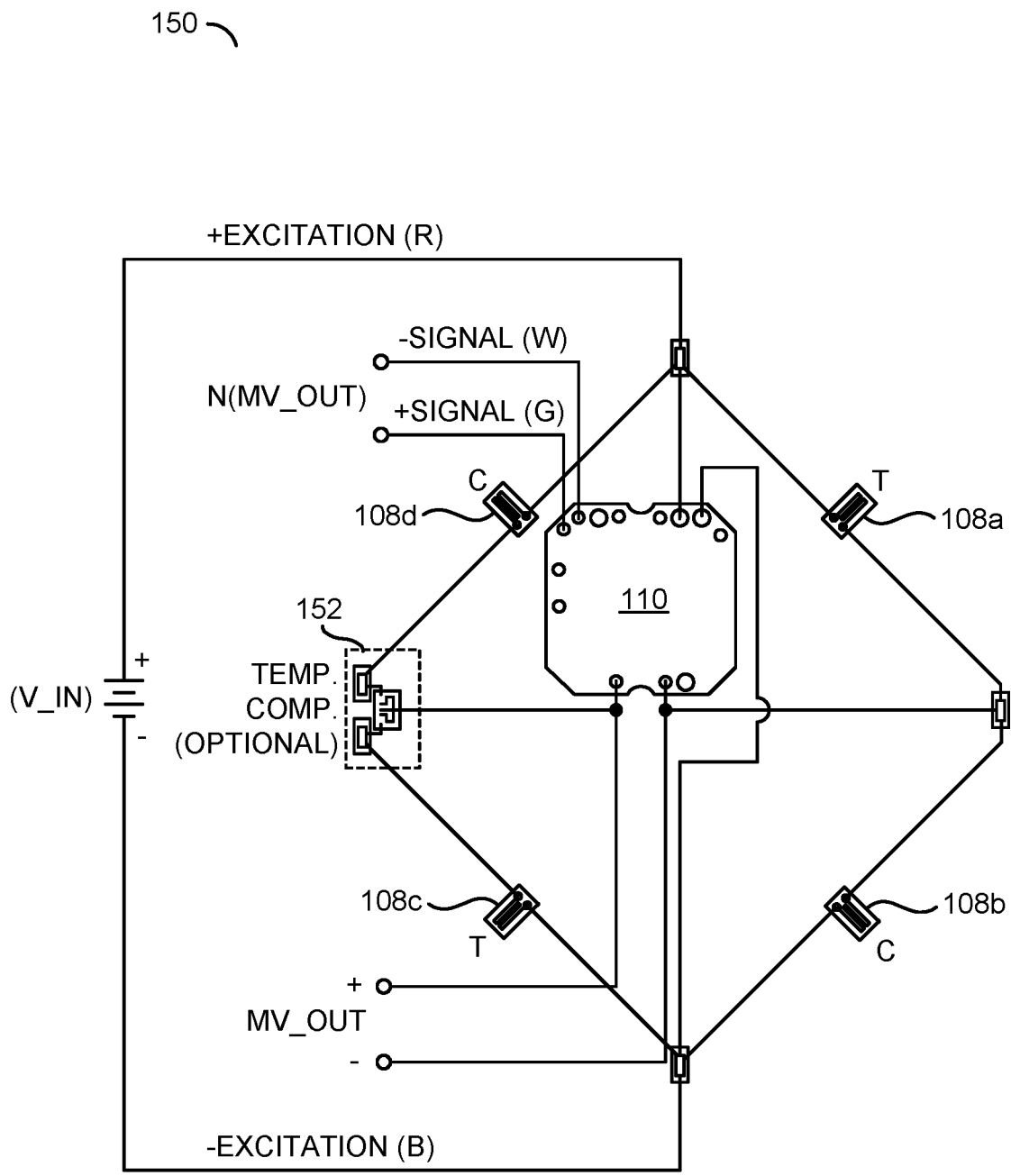
FIG. 6 is a diagram illustrating an example implementation of a sensor circuit in accordance with an example embodiment of the invention.

Referring to FIG. 6, a diagram is shown illustrating an example implementation of a sensor circuit in accordance with an example embodiment of the invention. In an example, a sensor circuit 150 may comprise the strain gauges 108a-108d connected in the Wheatstone bridge configuration 120 (e.g., as described above in connection with FIG. 4) and the multiplier circuit 110. In an example, a first terminal of the strain gauge 108a may be connected to a first terminal of the strain gauge 108b. A second terminal of the strain gauge 108b may be connected to a first terminal of the strain gauge 108c. A second terminal of the strain gauge 108c may be connected to a first terminal of the strain gauge 108d. A second terminal of the strain gauge 108d may be connected to a second terminal of the strain gauge 108a. A first terminal of the multiplier circuit 110 may be connected to a first node of the Wheatstone bridge formed by the connection of the second terminal of the strain gauge 108d and the second terminal of the strain gauge 108a. A second terminal of the multiplier circuit 110 may be connected to a second node of the Wheatstone bridge formed by the connection of the second terminal of the strain gauge 108b and the first terminal of the strain gauge 108c. A third terminal of the multiplier circuit 110 may be connected to a third node of the Wheatstone bridge formed by the connection of the first terminal of the strain gauge 108a and the first terminal of the strain gauge 108b. A fourth terminal of the multiplier circuit 110 may be connected to a fourth node of the Wheatstone bridge formed by the connection of the second terminal of the strain gauge 108c and the first terminal of the strain gauge 108d.

In an example, an excitation supply voltage (e.g., V_IN) may be connected between (i) the first node of the Wheatstone bridge formed by the connection of the second terminal of the strain gauge 108d and the second terminal of the strain gauge 108a, and (ii) a second node of the Wheatstone bridge formed by the connection of the second terminal of the strain gauge 108b and the first terminal of the strain gauge 108c. In an example, a positive side of the excitation supply voltage V_IN may be presented to the first node and a negative side of the excitation supply voltage V_IN may be presented to the second node. In an example, a first output signal MV_OUT of the Wheatstone bridge may be presented between (i) the third node of the Wheatstone bridge formed by the connection of the second terminal of the strain gauge 108c and the first terminal of the strain gauge 108d, and (ii) the fourth node of the Wheatstone bridge formed by the connection of the second terminal of the strain gauge 108a and the first terminal of the strain gauge 108b. In an example, a negative side of the first output signal MV_OUT may be presented at the third node of the Wheatstone bridge and a positive side of the first output signal MV_OUT may be presented at the fourth node of the Wheatstone bridge.

In various embodiments, temperature compensation and/or bridge balancing may be integrated into the multiplier circuit 110. However, depending on a level of accuracy to be achieved, optional temperature compensation circuitry 152 may be implemented at the fourth node of the Wheatstone bridge configuration 120. In an example, when a specification is open on accuracy (e.g., a 1% sensor), temperature compensation circuitry 152 may be omitted. In another example, when an extremely high accuracy is specified (e.g., a few counts), temperature compensation circuitry 152 may be implemented to ensure the specified accuracy.

In an example, a second output signal (e.g., N(MV_OUT)) may be presented by an output of the circuit 110. In an example, the circuit 110 is generally configured to generate the second output signal N(MV_OUT) in response to the excitation voltage V_IN and the first output signal MV_OUT. In an example, a negative side of the second output signal N(MV_OUT) may be presented at a fifth terminal of the multiplier circuit 110 and a positive side of the second output signal N(MV_OUT) may be presented at a sixth terminal of the multiplier circuit 110.

Factors that generally need to be considered before selecting a strain gauge are the direction, type, and resolution of the strain to be measured. To measure minute strains, minute resistance changes need to be measured. The Wheatstone bridge configuration is generally capable of measuring small resistance changes. In an example, a letter (e.g., T or C) is associated with each of the strain gauges 108a-108d to indicate a tensile (positive) strain T is applied to gauges 108a and 108c, and a compressive (negative) strain C. In general, the total strain is the sum of the four strains is applied to gauges 108b and 108d.

In an example, the total strain is generally represented by a change in the first output signal MV_OUT. If each of the strain gauges 108a-108d has the same positive strain, the total strain will be zero and the first output signal MV_OUT will remain unchanged. Bending, axial, and/or shear strain are the most common types of strain measured. The actual arrangement of the strain gauges 108a-108d generally determines the type of strain being measured and the change in a voltage level of the first output signal MV_OUT. In an example, if a positive (tensile) strain is applied to gauges 108a and 108c, and a negative (compressive) strain is applied to gauges 108b and 108d, the total strain will generally be four times the strain on one of the strain gauges 108a-108d. Since the total strain is four times the strain on each of the strain gauges 108a-108d, the output of the Wheatstone bridge configuration is generally four times larger than the output of a single one of the strain gauges 108a-108d. Therefore, greater sensitivity and resolution may be possible when more than one strain gauge in a Wheatstone bridge configuration is used instead of a single strain gauge. The second output signal N(MV_OUT) generally comprises a scaled version of the first output signal MV_OUT. A ratio (N) between the first output signal MV_OUT and the second output signal N(MV_OUT) is generally greater than 1. The second output signal N(MV_OUT) generally provides an output signal with an effective gauge factor greater than the native gauge factor of the strain gauges 108a-108d.

Figure 7:
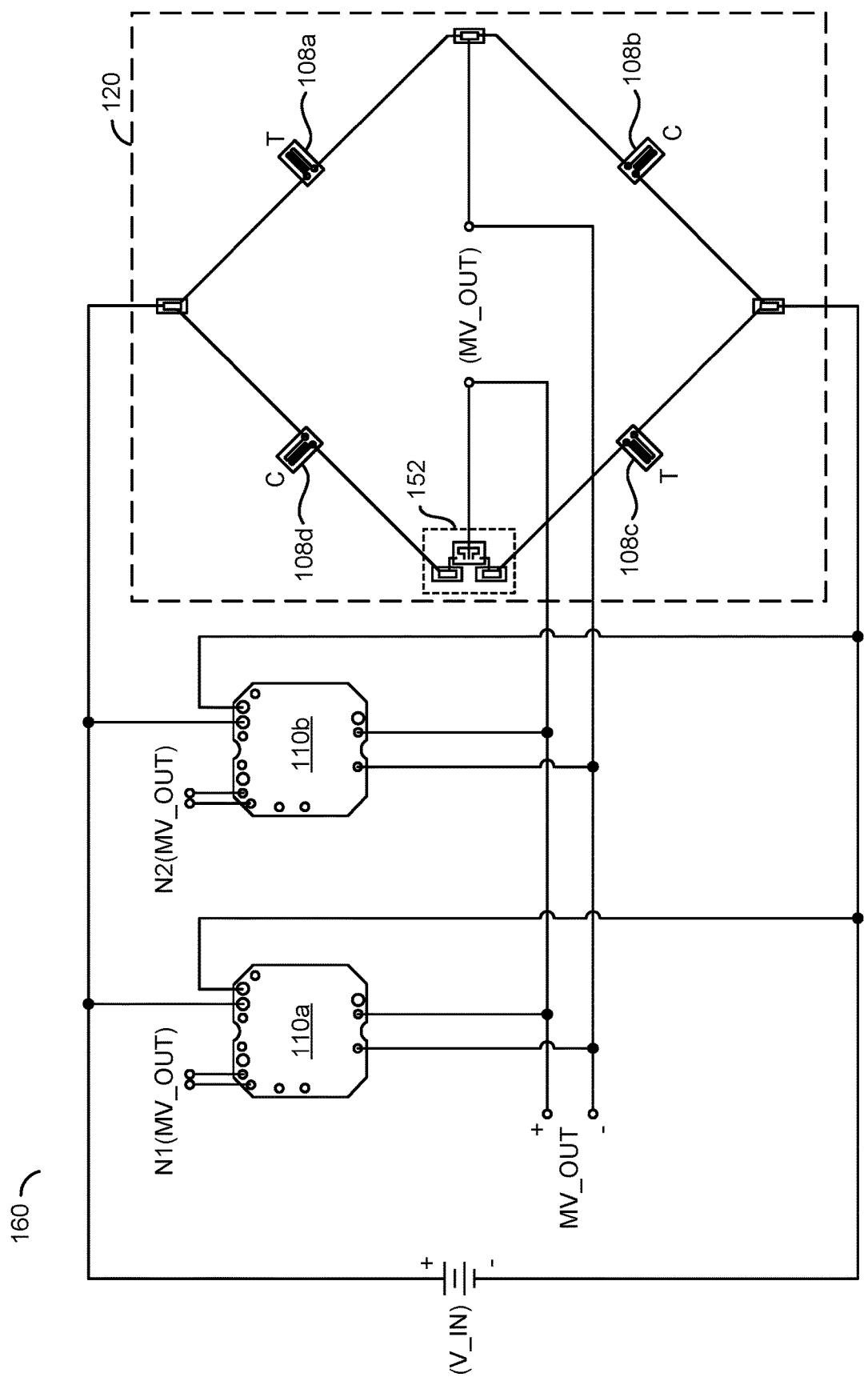
FIG. 7 is a diagram illustrating another example implementation of a sensor circuit in accordance with an example embodiment of the invention.

Referring to FIG. 7, a diagram is shown illustrating another example implementation of a sensor circuit in accordance with an example embodiment of the invention. In an example, a sensor circuit 160 may comprise the strain gauges 108a-108d connected in the Wheatstone bridge configuration 120 and a plurality of multiplier circuits 110a-110n. The Wheatstone bridge configuration 120 is illustrated including the optional temperature compensation circuitry 152, which may be omitted when not for achieving a specified accuracy of a particular application. An example of the circuit 160 implemented with two multiplier circuit 110a and 110b is shown to simplify description. In an example, a first terminal of the strain gauge 108a may be connected to a first terminal of the strain gauge 108b. A second terminal of the strain gauge 108b may be connected to a first terminal of the strain gauge 108c. A second terminal of the strain gauge 108c may be connected to a first terminal of the strain gauge 108d. A second terminal of the strain gauge 108d may be connected to a second terminal of the strain gauge 108a. A first terminal of the multiplier circuit 110a and a first terminal of the multiplier circuit 110b may be connected to a first node of the Wheatstone bridge configuration 120 formed by the connection of the second terminal of the strain gauge 108d and the second terminal of the strain gauge 108a. A second terminal of the multiplier circuit 110a and a second terminal of the multiplier circuit 110b may be connected to a second node of the Wheatstone bridge configuration 120 formed by the connection of the second terminal of the strain gauge 108b and the first terminal of the strain gauge 108c. A third terminal of the multiplier circuit 110a and a third terminal of the multiplier circuit 110b may be connected to a third node of the Wheatstone bridge configuration 120 formed by the connection of the first terminal of the strain gauge 108a and the first terminal of the strain gauge 108b. A fourth terminal of the multiplier circuit 110a and a fourth terminal of the multiplier circuit 110b may be connected to a fourth node of the Wheatstone bridge configuration 120 formed by the connection of the second terminal of the strain gauge 108c and the first terminal of the strain gauge 108d.

In an example, an excitation supply voltage (e.g., V_IN) may be connected between (i) the first node of the Wheatstone bridge configuration 120 formed by the connection of the second terminal of the strain gauge 108d and the second terminal of the strain gauge 108a, and (ii) the second node of the Wheatstone bridge configuration 120 formed by the connection of the second terminal of the strain gauge 108b and the first terminal of the strain gauge 108c. In an example, a positive side of the excitation supply voltage V_IN may be presented to the first node and a negative side of the excitation supply voltage V_IN may be presented to the second node. In an example, a first output signal MV_OUT of the Wheatstone bridge configuration 120 may be presented between (i) the third node of the Wheatstone bridge configuration 120 formed by the connection of the second terminal of the strain gauge 108c and the first terminal of the strain gauge 108d, and (ii) the fourth node of the Wheatstone bridge configuration 120 formed by the connection of the second terminal of the strain gauge 108a and the first terminal of the strain gauge 108b. In an example, a negative side of the first output signal MV_OUT may be presented at the third node of the Wheatstone bridge configuration 120 and a positive side of the first output signal MV_OUT may be presented at the fourth node of the Wheatstone bridge configuration 120.

In an example, a second output signal (e.g., N1(MV_OUT)) may be presented by an output of the circuit 110a and a third output signal (e.g., N2(MV_OUT)) may be presented by an output of the circuit 110b. In an example, the circuit 110a is generally configured to generate the second output signal N1(MV_OUT) in response to the excitation voltage V_IN and the first output signal MV_OUT. In an example, the circuit 110b is generally configured to generate the third output signal N2(MV_OUT) in response to the excitation voltage V_IN and the first output signal MV_OUT. In an example, a negative side of the second output signal N1(MV_OUT) may be presented at a fifth terminal of the multiplier circuit 110a and a positive side of the second output signal N1(MV_OUT) may be presented at a sixth terminal of the multiplier circuit 110a. In an example, a negative side of the third output signal N2(MV_OUT) may be presented at a fifth terminal of the multiplier circuit 110b and a positive side of the third output signal N2(MV_OUT) may be presented at a sixth terminal of the multiplier circuit 110b. Other numbers of multiplier circuits 110a-110n may be implemented similarly.

Factors that generally need to be considered before selecting a strain gauge are the direction, type, and resolution of the strain to be measured. To measure minute strains, minute resistance changes need to be measured. The Wheatstone bridge configuration 120 is generally capable of measuring small resistance changes. In an example, a letter (e.g., T or C) is associated with each of the strain gauges 108a-108d to indicate a tensile (positive) strain T is applied to gauges 108a and 108c, and a compressive (negative) strain C. In general, the total strain is the sum of the four strains is applied to gauges 108b and 108d.

In an example, the total strain is generally represented by a change in the first output signal MV_OUT. If each of the strain gauges 108a-108d has the same positive strain, the total strain will be zero and the first output signal MV_OUT will remain unchanged. Bending, axial, and/or shear strain are the most common types of strain measured. The actual arrangement of the strain gauges 108a-108d generally determines the type of strain being measured and the change in a voltage level of the first output signal MV_OUT. In an example, if a positive (tensile) strain is applied to gauges 108a and 108c, and a negative (compressive) strain is applied to gauges 108b and 108d, the total strain will generally be four times the strain on one of the strain gauges 108a-108d. Since the total strain is four times the strain on each of the strain gauges 108a-108d, the output of the Wheatstone bridge configuration is generally four times larger than the output of a single one of the strain gauges 108a-108d. Therefore, greater sensitivity and resolution may be possible when more than one strain gauge is used. The second output signal N1(MV_OUT) and the third output signal N2(MV_OUT) generally comprise scaled versions of the first output signal MV_OUT. A ratio (N1) between the first output signal MV_OUT and the second output signal N1(MV_OUT) is generally greater than 1. A ratio (N2) between the first output signal MV_OUT and the third output signal N2(MV_OUT) is generally greater than one and different from the ratio N1. The second output signal N1(MV_OUT) and the third output signal N2(MV_OUT) generally provide output signals with effective gauge factors greater than the native gauge factor of the strain gauges 108a-108d.

Figure 8:
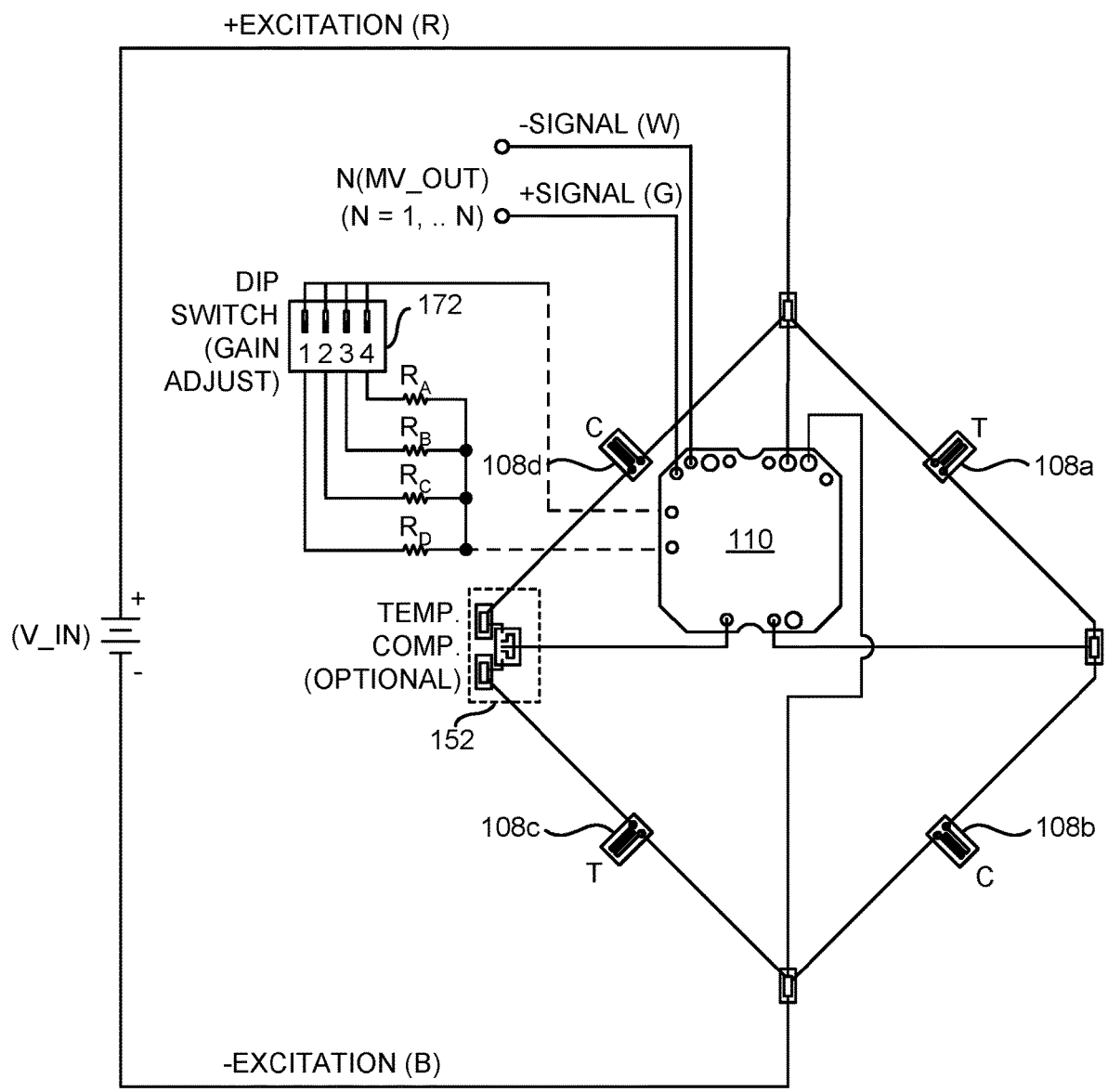
FIG. 8 is a diagram illustrating still another example implementation of a sensor circuit in accordance with an example embodiment of the invention.

Referring to FIG. 8, a diagram is shown illustrating still another example implementation of a sensor circuit in accordance with an example embodiment of the invention. In an example, a sensor circuit 170 may comprise the strain gauges 108a-108d connected in the Wheatstone bridge configuration 120 (e.g., as described above in connection with FIG. 4), the multiplier circuit 110, a switch circuit 172, and a plurality of resistors. In an example, the switch circuit 172 may implement a plurality of switches in a dual inline package (DIP). In an example, the switches may be implemented a single-pole-single-throw switches. In an example, the plurality of resistors may be implemented having different resistance values (e.g., $R_A$, $R_B$, $R_C$, $R_D$, etc.).

In an example, a first terminal of the strain gauge 108a may be connected to a first terminal of the strain gauge 108b. A second terminal of the strain gauge 108b may be connected to a first terminal of the strain gauge 108c. A second terminal of the strain gauge 108c may be connected to a first terminal of the strain gauge 108d. A second terminal of the strain gauge 108d may be connected to a second terminal of the strain gauge 108a. A first terminal of the multiplier circuit 110 may be connected to a first node of the Wheatstone bridge formed by the connection of the second terminal of the strain gauge 108d and the second terminal of the strain gauge 108a. A second terminal of the multiplier circuit 110 may be connected to a second node of the Wheatstone bridge formed by the connection of the second terminal of the strain gauge 108b and the first terminal of the strain gauge 108c. A third terminal of the multiplier circuit 110 may be connected to a third node of the Wheatstone bridge formed by the connection of the first terminal of the strain gauge 108a and the first terminal of the strain gauge 108b. A fourth terminal of the multiplier circuit 110 may be connected to a fourth node of the Wheatstone bridge formed by the connection of the second terminal of the strain gauge 108c and the first terminal of the strain gauge 108d. A fifth terminal of the multiplier circuit 110 may be connected to a first terminal of each of the switches of the switch circuit 172. A second terminal of each of the switches of the switch circuit 172 may be connected to a first terminal of a respective resistor in the plurality of resistors. A second terminal of each of the plurality of resistors may be connected to a sixth terminal of the multiplier circuit 110.

In an example, an excitation supply voltage (e.g., V_IN) may be connected between (i) the first node of the Wheatstone bridge formed by the connection of the second terminal of the strain gauge 108d and the second terminal of the strain gauge 108a, and (ii) a second node of the Wheatstone bridge formed by the connection of the second terminal of the strain gauge 108b and the first terminal of the strain gauge 108c. In an example, a positive side of the excitation supply voltage V_IN may be presented to the first node and a negative side of the excitation supply voltage V_IN may be presented to the second node. In an example, a first output signal MV_OUT of the Wheatstone bridge may be presented between (i) the third node of the Wheatstone bridge formed by the connection of the second terminal of the strain gauge 108c and the first terminal of the strain gauge 108d, and (ii) the fourth node of the Wheatstone bridge formed by the connection of the second terminal of the strain gauge 108a and the first terminal of the strain gauge 108b. In an example, a negative side of the first output signal MV_OUT may be presented at the third node of the Wheatstone bridge and a positive side of the first output signal MV_OUT may be presented at the fourth node of the Wheatstone bridge.

In an example, a second output signal (e.g., N(MV_OUT)) may be presented by an output of the circuit 110. In an example, the circuit 110 is generally configured to generate the second output signal N(MV_OUT) in response to the excitation voltage V_IN, the first output signal MV_OUT, and the setting of the plurality of switches in the switch circuit 172. In an example, a negative side of the second output signal N(MV_OUT) may be presented at a seventh terminal of the multiplier circuit 110 and a positive side of the second output signal N(MV_OUT) may be presented at an eighth terminal of the multiplier circuit 110. The second output signal N(MV_OUT) generally comprises a scaled version of the first output signal MV_OUT. A ratio (N) between the first output signal MV_OUT and the second output signal N(MV_OUT) is generally greater than 1. The switch circuit 172 and the plurality of resistors are generally configured to provide a gain adjustment of the multiplier circuit 110. The gain adjustment provided by the switch circuit 172 and the plurality of resistors generally sets a value of the ratio N. The second output signal N(MV_OUT) generally provides an output signal with an effective gauge factor that may be set within a range of gauge factors using the switch circuit 172.

Figure 9:
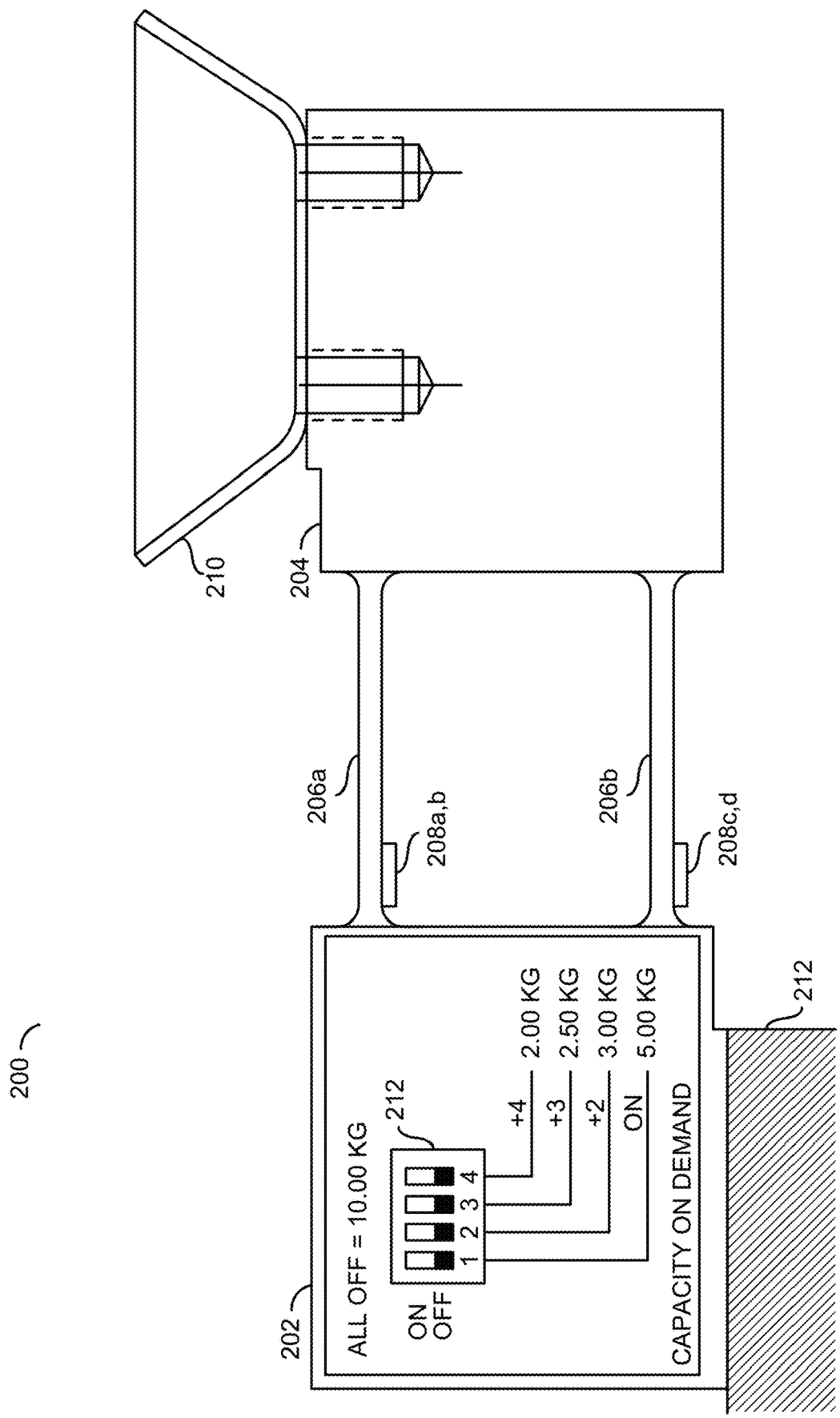
FIG. 9 is a diagram illustrating another application of a sensor in accordance with an example embodiment of the invention.

Referring to FIG. 9, a diagram is shown illustrating an weight measuring device in accordance with an embodiment of the invention. In an example, a weight measuring device (electronic scale or balance) 200 may be implemented utilizing the sensor circuit of FIG. 8. In an example, the weight measuring device 200 may comprise a first (static or anchor) end portion 202, a second (dynamic or moving) end portion 204, a first strain member (or beam) 206a, a second strain member (or beam) 206b), a plurality of strain gauges 208a-208d, and a pan (or bowl) 210.

In an example, the first end portion 202 may be fixed to a base 212. The first strain member 206a may be connected between a top of the first end portion 202 and a top of the second end portion 204. The second strain member 206b may be connected between a bottom of the first end portion 202 and a bottom of the second end portion 204. The first strain member 206a and the second strain member 206b are generally parallel. The pan 210 may be coupled to a top surface of the second end portion 204. The strain gauges 208a and 208b may be attached to a bottom surface of the first strain member 206a at an end adjacent to the first end member 202. The strain gauges 208c and 208d may be attached to a bottom surface of the second strain member 206b at an end adjacent to the first end member 202. In an example, the strain gauges 208a-208d may be connected in a Wheatstone bridge configuration (e.g., as described above in connection with FIG. 4). An output value of the Wheatstone bridge configuration may be converted into a weight value.

In an example, the weight measuring device 200 may implement a capacity on demand feature in accordance with an example embodiment of the invention. In an example, the strain gauges 208a-208d may be connected to a sensor circuit as described above in connection with FIG. 8. In an example, a weight capacity of the weight measuring device 200 may be selected (programmed) using a plurality of switches of a switch circuit 212. In an example, the plurality of switches of the switch circuit 212 may be implemented in a dual inline package (DIP). In an example, four switches may be implemented to provide five weight ranges (e.g., 10 KG, 5 KG, 3 KG, 2.5 KG, and 2 KG).

Figure 10:
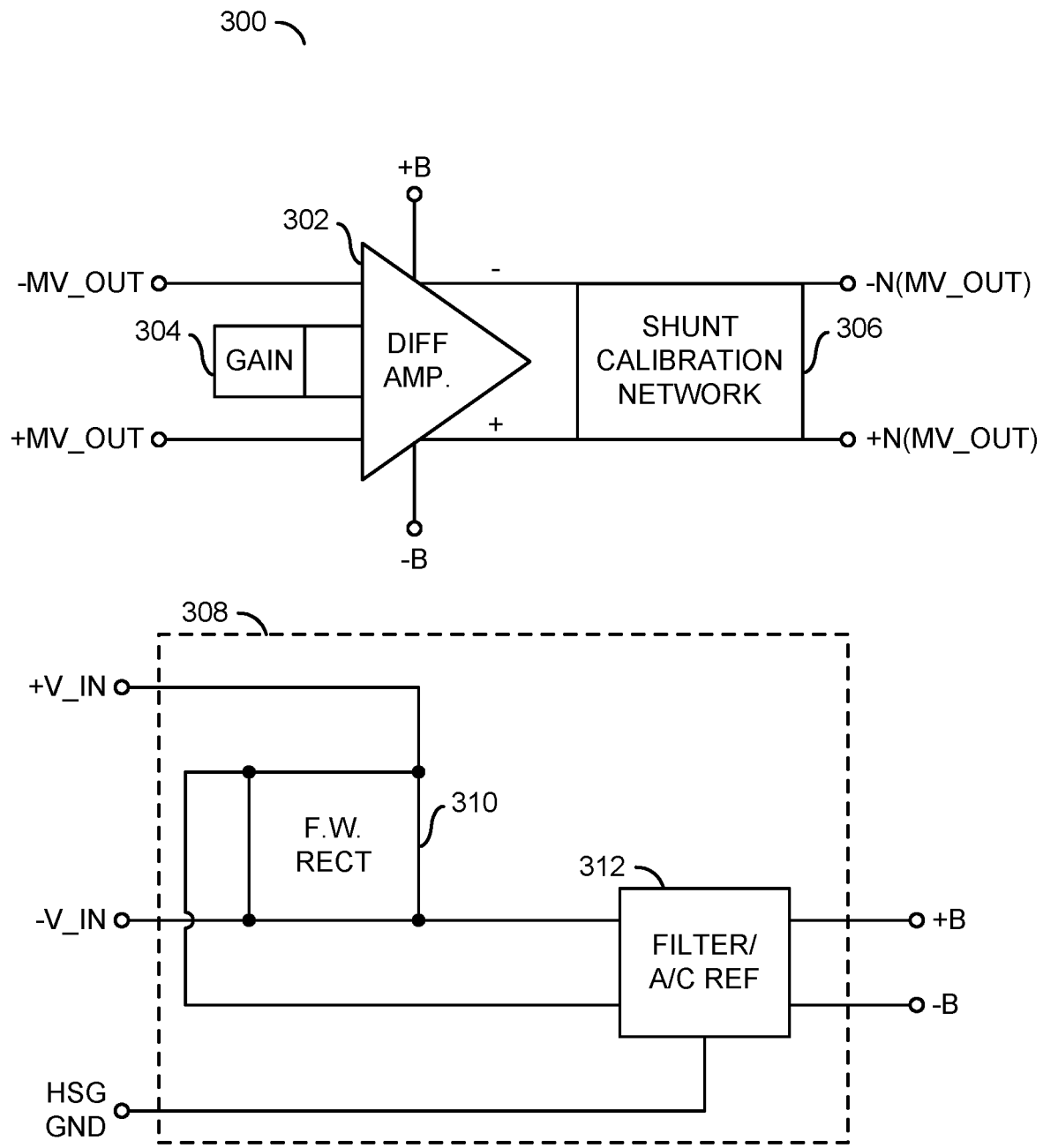
FIG. 10 is a diagram illustrating an example implementation of a multiplier circuit in accordance with an example embodiment of the invention.

Referring to FIG. 10, a diagram is shown illustrating an example implementation of a multiplier circuit in accordance with an example embodiment of the invention. In an example, a circuit 300 may implement a multiplier circuit in accordance with an example embodiment of the invention. In an example, the circuit 300 may be used to implement the multiplier circuits 110 and 110a-110n described above. In an example, the circuit 300 may comprise a block (or circuit) 302, a block (or circuit) 304, a block (or circuit) 306, and a block (or circuit) 308. The circuit 302 may implement a differential amplifier circuit. The circuit 304 may implement a gain block (or circuit). The circuit 306 may implement a shunt calibration block (or circuit). The circuit 308 may implement a power supply circuit.

In an example, the differential amplifier circuit 302 may have a first input that may receive the negative side of the signal MV_OUT, a second input that may receive the positive side of the signal MV_OUT, a first input/output that may be connected to a first terminal of the gain block 304, a second input/output that may be connected to a second terminal of the gain block 304, a first output that may be connected to a first terminal of the shunt calibration block 306, and a second output that may be connected to a second terminal of the shunt calibration block 306. The shunt calibration block 306 may have a third terminal that may present the negative side of the signal N(MV_OUT) and a fourth terminal that may present the positive side of the signal N(MV_OUT). The circuit 308 may have a first terminal that may receive the negative side of the excitation supply voltage V_IN, a second terminal that may receive the positive side of the excitation supply voltage V_IN, a third terminal that may be connected to a system ground potential (e.g., HSG GND), a fourth terminal that may present a positive supply voltage (e.g., +B), and a fifth terminal that present a negative supply voltage (e.g., −B). The positive supply voltage +B and the negative supply voltage −B may be presented to power terminals of the differential amplifier circuit 302.

In an example, the circuit 308 may comprise a block (or circuit) 310 and a block (or circuit) 312. The circuit 310 may be implemented as a full wave bridge rectifier. The circuit 312 may implement a filter and A/C reference circuit. In an example, the circuit 310 may have a first terminal that may receive the positive side of the excitation supply voltage V_IN, a second terminal that may receive the negative side of the excitation supply voltage V_IN, a third terminal that may be connected to a first terminal of the circuit 312, and a fourth terminal that may be connected to a second terminal of the circuit 312. The circuit 312 may have a third terminal that may be connected to the system ground potential HSG GND, a fourth terminal that may present the positive supply voltage +B, and a fifth terminal that present the negative supply voltage −B.

Figure 11:
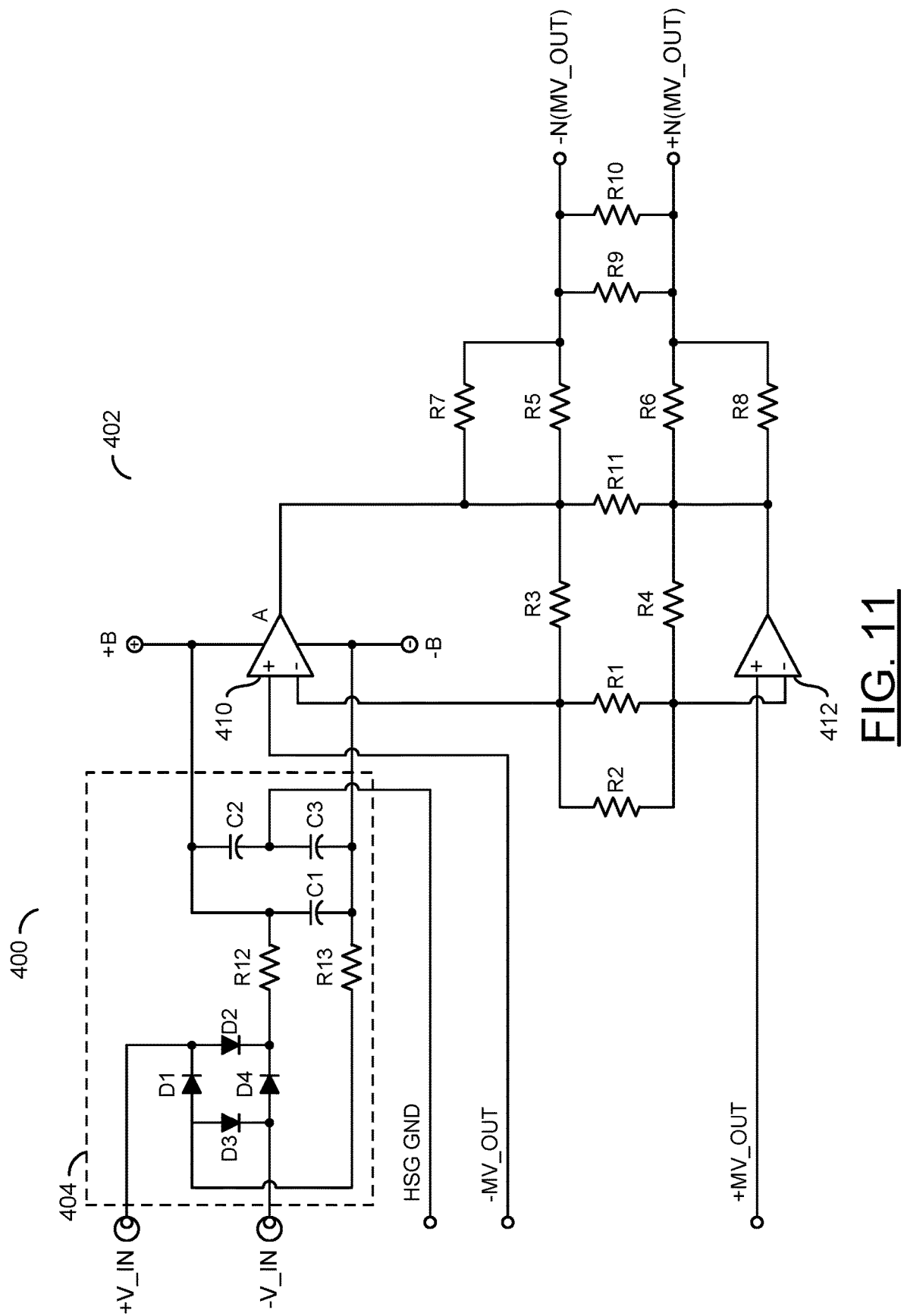
FIG. 11 is a diagram illustrating an example implementation of a multiplier circuit in accordance with an example embodiment of the invention.

Referring to FIG. 11, a diagram illustrating an example implementation of a multiplier circuit in accordance with an example embodiment of the invention. In an example, a circuit 400 may implement a multiplier circuit in accordance with an example embodiment of the invention. In an example, the circuit 400 may be used to implement the multiplier circuits 110 and 110a-110n described above. In an example, the circuit 400 may comprise a block (or circuit) 402 and a block (or circuit) 404. The circuit 402 may implement a differential amplifier circuit. The circuit 404 may implement a power supply circuit. In an example, the differential amplifier circuit 402 may have a first input that may receive the negative side of the signal MV_OUT, a second input that may receive the positive side of the signal MV_OUT, a first output that may present the negative side of the signal N(MV_OUT) and a second output that may present the positive side of the signal N(MV_OUT). The circuit 404 may have a first terminal that may receive the positive side of the excitation supply voltage V_IN, a second terminal that may receive the negative side of the excitation supply voltage V_IN, a third terminal that may be connected to the system ground potential (e.g., HSG GND), a fourth terminal that may present the positive supply voltage (e.g., +B), and a fifth terminal that present the negative supply voltage (e.g., −B). The positive supply voltage +B and the negative supply voltage −B may be presented to power terminals of the differential amplifier circuit 402.

In an example, the circuit 402 may comprise a first differential amplifier 410, a second differential amplifier 412, and a plurality of resistors R1-R10. In an example, the first differential amplifier 410 and the second differential amplifier 412 may be implemented in a single integrated circuit package. In an example, the first differential amplifier 410 and the second differential amplifier 412 may be implemented as general purpose rail-to-rail dual amplifiers (e.g., an OP727ARU integrated circuit available fro Analog Devices Inc.). The negative side of the signal MV_OUT may be presented to a positive input terminal of the differential amplifier 410. The positive side of the signal MV_OUT may be presented to a positive input terminal of the differential amplifier 412. A negative input terminal of the differential amplifier 410 may be connected to a first terminal of the resistor R1, a first terminal of the resistor R2, and a first terminal of the resistor R3. A negative input terminal of the differential amplifier 412 may be connected to a second terminal of the resistor R1, a second terminal of the resistor R2, and a first terminal of the resistor R4. An output of the differential amplifier 410 may be connected to a second terminal of the resistor R3, a first terminal of the resistor R5, and a first terminal of the resistor R7, and a first terminal of the resistor R11. An output of the differential amplifier 412 may be connected to a second terminal of the resistor R4, a first terminal of the resistor R6, a first terminal of the resistor R8, and a second terminal of the resistor R11. A second terminal of the resistor R5 may be connected to a second terminal of the resistor R7, a first terminal of the resistor R9, and a first terminal of the resistor R10. A second terminal of the resistor R6 may be connected to a second terminal of the resistor R8, a second terminal of the resistor R9, and a second terminal of the resistor R10. The negative side of the signal N(MV_OUT) may be presented at a node formed by the connection of the second terminal of the resistor R5, the second terminal of the resistor R7, the first terminal of the resistor R9, and the first terminal of the resistor R10. The positive side of the signal N(MV_OUT) may be presented at a node formed by the connection of the second terminal of the resistor R6, the second terminal of the resistor R8, the second terminal of the resistor R9, and the second terminal of the resistor R10.

In an example, the circuit 404 may comprise a plurality of diodes D1-D4, a resistor R12, a resistor R13, and a plurality of capacitors C1-C3. The diodes D1-D4 may be connected to form a full wave bridge rectifier circuit. The positive side of the excitation supply voltage V_IN may be presented to a first node formed by connection of a cathode of the diode D1 and an anode of the diode D2. The negative side of the excitation supply voltage V_IN may be presented to a second node formed by connection of a cathode of the diode D3 and an anode of the diode D4. A third node formed by connection of a cathode of the diode D2 and a cathode of the diode D4 may be connected to a first terminal of the resistor R12. A fourth node formed by connection of an anode of the diode D1 and an anode of the diode D3 may be connected to a first terminal of the resistor R13. A second terminal of the resistor R12 may be connected to a first terminal of the capacitor C1 and a first terminal of the capacitor C2. A second terminal of the resistor R13 may be connected to a second terminal of the capacitor C1 and a first terminal of the capacitor C3. A second terminal of the capacitor C2 may be connected to a second terminal of the capacitor C3. A fifth node formed by the connection of the second terminal of the capacitor C2 and the second terminal of the capacitor C3 may be connected to the system ground potential HSG GND. A sixth node formed by the connection of the first terminal of the capacitor C1 and the first terminal of the capacitor C2 may present the positive supply voltage +B. A seventh node formed by the connection of the second terminal of the capacitor C1 and the first terminal of the capacitor C3 may present the negative supply voltage −B.

Figure 12:
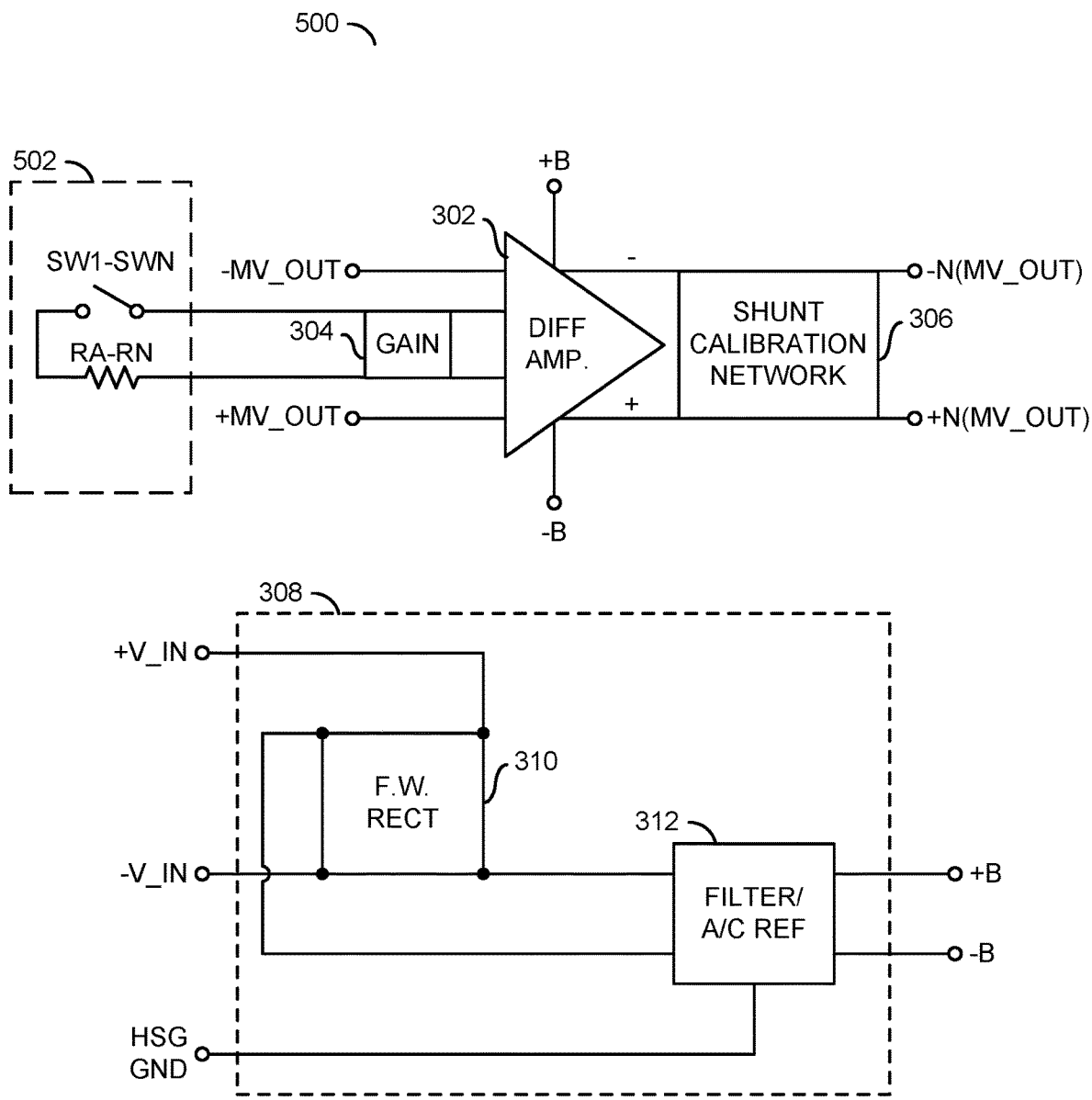
FIG. 12 is a diagram illustrating an example implementation of a multiplier circuit in accordance with an example embodiment of the invention.

Referring to FIG. 12, a diagram is shown illustrating another example implementation of a multiplier circuit in accordance with an example embodiment of the invention. In an example, a circuit 500 may implement a multiplier circuit in accordance with an example embodiment of the invention. In an example, the circuit 500 may be used to implement the sensor circuit 170 described above in connection with FIG. 8. In an example, the circuit 500 may be implemented similarly to the circuit 300 (described above in connection with FIG. 10), except that a gain adjust circuit 502 may be connected to the gain block 304. In an example, the gain adjust circuit 502 may comprise a plurality of switches SW1-SWN and a plurality of resistors RA-RN connected to facilitate selection of a number (e.g., N) of predefined gain (or gauge factor) values.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:
1. An apparatus comprising:
   a sensor comprising a strain member configured to deform according to a force applied thereto;

a plurality of strain gauges bonded to the sensor and connected to form a Wheatstone bridge, wherein (i) the Wheatstone bridge is configured to generate a first output signal in response to an excitation voltage and (ii) the first output signal is proportional to the force applied to the sensor; and a multiplier circuit mounted within the sensor and coupled to the Wheatstone bridge, wherein the multiplier circuit is configured to generate a second output signal in response to said excitation voltage and the first output signal, and the second output signal comprises a scaled version of the first output signal.

2. The apparatus according to claim 1, further comprising:
a connector assembly mounted on said sensor and configured to (i) provide the excitation voltage to the Wheatstone bridge and the multiplier circuit, and (ii) present the first output signal and the second output signal.

3. The apparatus according to claim 1, wherein each of the first output signal and the second output signal have a millivolt per volt relationship to the excitation voltage.

4. The apparatus according to claim 1, wherein the first output signal and the second output signal have different gauge factors.

5. The apparatus according to claim 1, wherein the first output signal has a first gauge factor and the second output signal has a second gauge factor, and the second gauge factor is a multiple of the first gauge factor.

6. The apparatus according to claim 1, wherein the first output signal has a first gauge factor and the second output signal has a second gauge factor, and a ratio of the second gauge factor to the first gauge factor is programmable.

7. The apparatus according to claim 1, wherein the first output signal has a first gauge factor and the second output signal has a second gauge factor, and a ratio of the second gauge factor to the first gauge factor is set by a plurality of switches.

8. The apparatus according to claim 1, wherein the sensor is configured to measure at least one of compression, tension, torque, and moments.

9. The apparatus according to claim 1, wherein the sensor is configured to measure weight.

10. The apparatus according to claim 1, wherein the sensor comprises an inner cylindrical member and an outer cylindrical member connected together by a plurality of beams and each of the plurality of strain gauges is bonded to a respective beam of the plurality of beams.

11. The apparatus according to claim 10, wherein the plurality of beams are configured to provide a predefined stiffness.

12. The apparatus according to claim 10, wherein the plurality of beams are configured to provide high-frequency dynamic measurements.

13. The apparatus according to claim 10, wherein the plurality of beams and the plurality of strain gauges are configured to provide an effective gauge factor that is greater than a gauge factor of the plurality of strain gauges.

14. The apparatus according to claim 1, wherein the strain member is configured to provide high-frequency dynamic measurements.

15. The apparatus according to claim 1, wherein each of the plurality of strain gauges comprises a nickel chromium alloy strain gauge.

16. A method of providing an effective gauge factor comprising:
mounting a plurality of strain gauges and a multiplier circuit to a sensor comprising a strain member configured to deform according to an applied force;
connecting the plurality of strain gauges to form a Wheatstone bridge, wherein (i) the Wheatstone bridge is configured to generate a first output signal in response to an excitation voltage and (ii) the first output signal is proportional to the applied force; and
coupling the first output signal to an input of the multiplier circuit, wherein the multiplier circuit is configured to generate a second output signal in response to the excitation voltage and the first output signal, and the second output signal comprises a scaled version of the first output signal.

17. The method according to claim 16, wherein the multiplier circuit and the strain member are configured to provide an effective gauge factor that is greater than a gauge factor of the plurality of strain gauges.

18. The method according to claim 16, wherein the strain member is configured to provide a predefined stiffness.

19. The method according to claim 16, wherein the strain member is configured to provide high-frequency dynamic measurements.

20. The method according to claim 16, further comprising configuring the sensor to measure at least one of compression, tension, torque, and moments.

* * * * *